(12) United States Patent
Sasaki

(10) Patent No.: US 12,314,038 B2
(45) Date of Patent: *May 27, 2025

(54) PRODUCTION SYSTEM, AND METHOD OF PRODUCING ARTICLE

(71) Applicant: CANON KABUSHIKI KAISHA, Tokyo (JP)

(72) Inventor: Tomonori Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,843

(22) Filed: May 30, 2023

(65) Prior Publication Data

US 2024/0028007 A1 Jan. 25, 2024

Related U.S. Application Data

(63) Continuation of application No. 16/522,546, filed on Jul. 25, 2019, now Pat. No. 11,703,834.

(30) Foreign Application Priority Data

Jul. 31, 2018 (JP) .................... 2018-144010
Jul. 1, 2019 (JP) .................... 2019-123147

(51) Int. Cl.
G05B 19/418 (2006.01)

(52) U.S. Cl.
CPC ..... *G05B 19/4184* (2013.01); *G05B 19/4183* (2013.01); *G05B 2219/24103* (2013.01)

(58) Field of Classification Search
USPC ........................................ 700/95
See application file for complete search history.

(56) References Cited

U.S. PATENT DOCUMENTS

2015/0323926 A1* 11/2015 Wang ................ G05B 23/0272
700/19
2017/0136627 A1 5/2017 Takaichi

FOREIGN PATENT DOCUMENTS

| CN | 201237735 Y | 5/2009 |
| CN | 105828213 A | 8/2016 |
| CN | 107765652 A | 3/2018 |

(Continued)

OTHER PUBLICATIONS

DE-4102056-A1 (Year: 1995).*

(Continued)

*Primary Examiner* — Hien D Khuu
(74) *Attorney, Agent, or Firm* — Canon U.S.A., Inc. IP Division

(57) ABSTRACT

In a production system, a control unit controls a first apparatus configured to start to operate after a waiting time and a second apparatus configured to starting to operation after a waiting time. A first sensor outputs a value that changes in response to operation of the first apparatus. A second sensor outputs a value that changes in response to operation of the second apparatus. The control unit compares a first time period from a starting of the operation of the first apparatus to an occurrence of a change in the value of the first sensor with a predetermined first threshold value, and compares a second time period from a starting of the operation of the second apparatus to an occurrence of a change in the value of the second sensor with a predetermined second threshold value.

38 Claims, 12 Drawing Sheets

(56) References Cited

FOREIGN PATENT DOCUMENTS

| | | | |
|---|---|---|---|
| CN | 108139715 | A | 6/2018 |
| JP | H0966443 | A | 3/1997 |
| JP | 2006215921 | A | 8/2006 |
| JP | 2007102644 | A | 4/2007 |
| JP | 2007213449 | A | 8/2007 |
| KR | 20180020891 | A | 2/2018 |

OTHER PUBLICATIONS

JP-4412228-B2 (Year: 2009).*
EP-1918885-A2 (Year: 2008).*
JP-5021547-B2 (Year: 2012).*

* cited by examiner

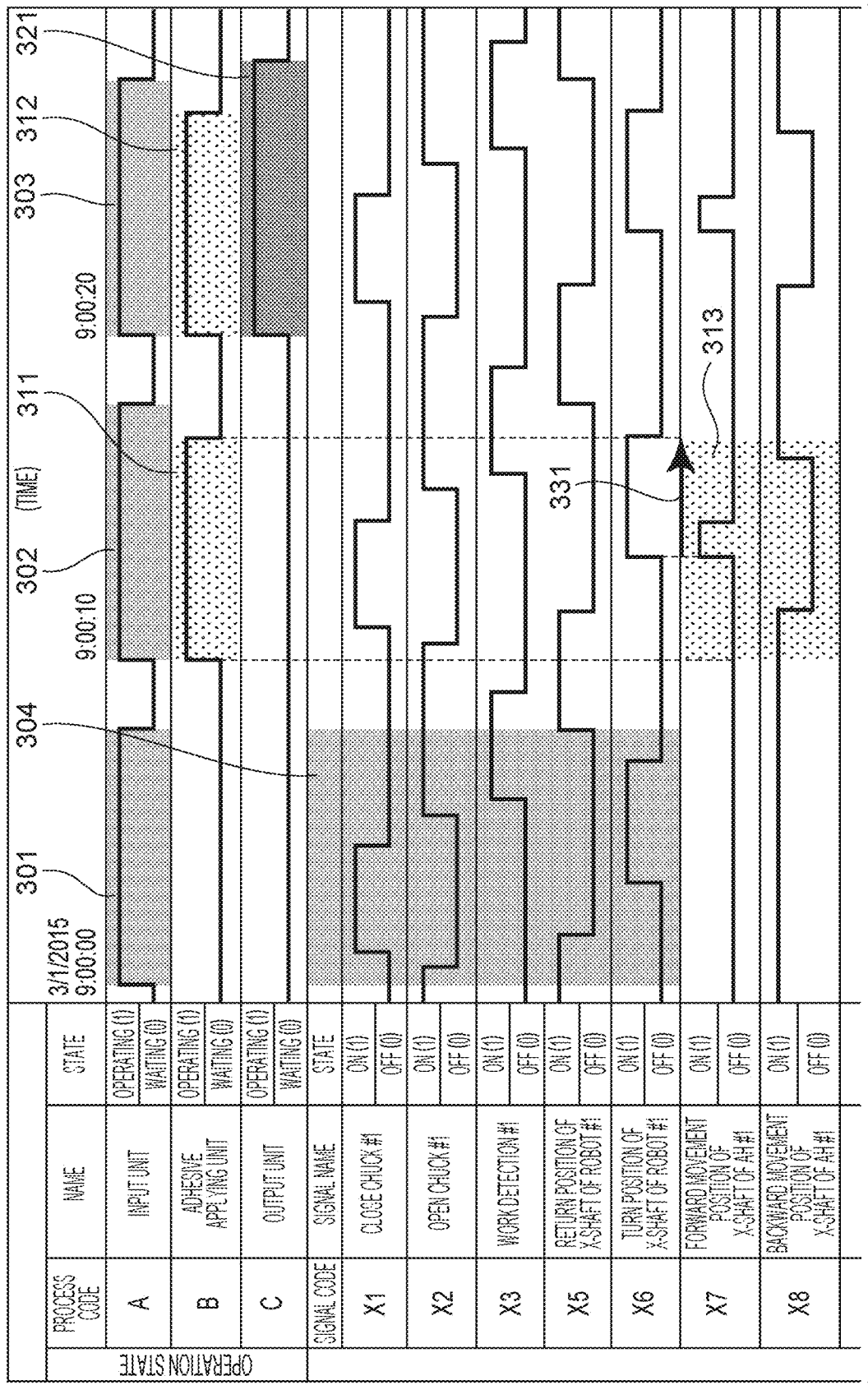

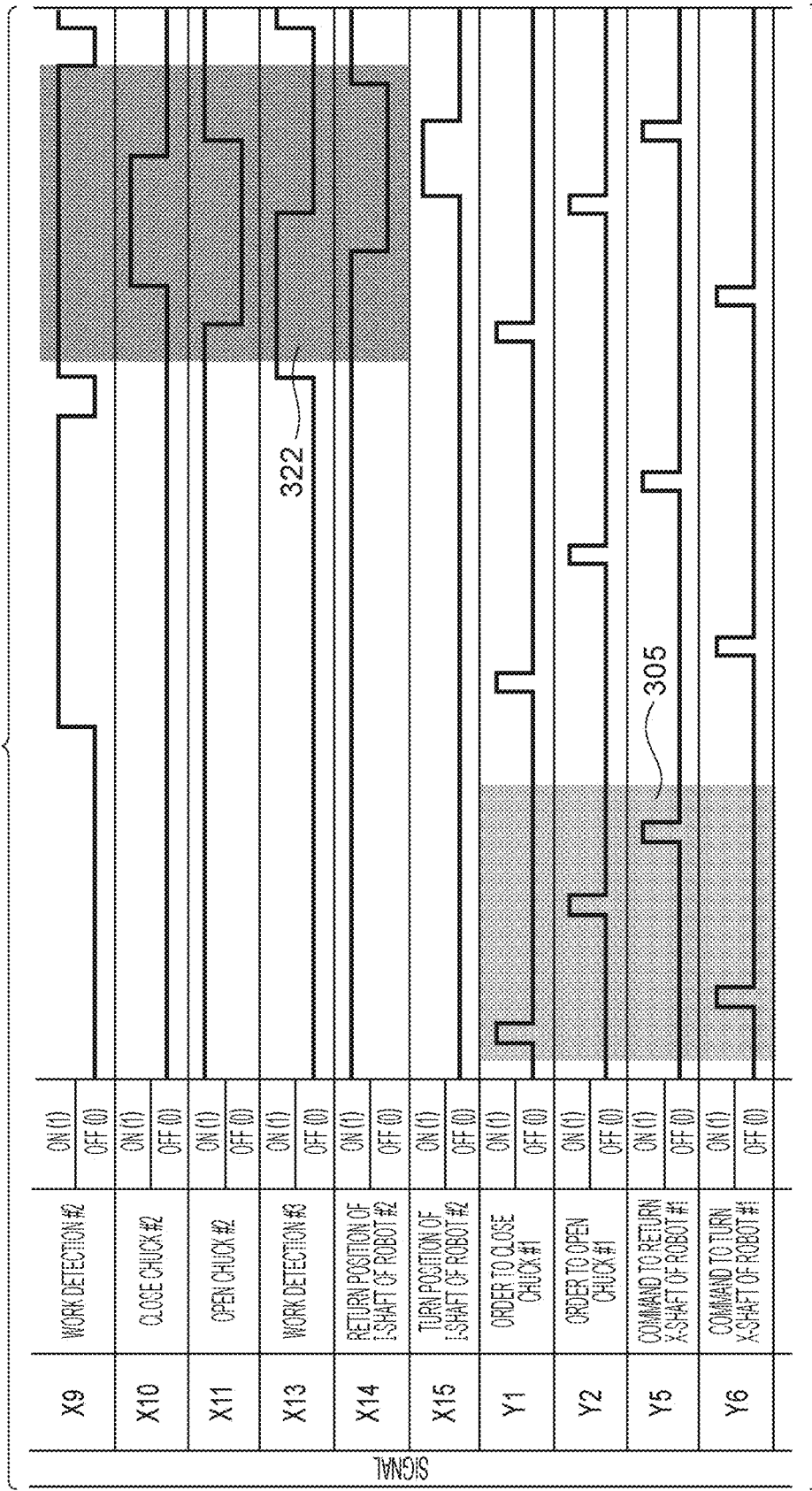

FIG. 4

| PROCESS CODE | NAME | OPERATION STATE NUMBER | SIGNAL CODE | SIGNAL NAME |
|---|---|---|---|---|
| A | INPUT UNIT | 1 | X1 | CLOSE CHUCK #1 |
| A | INPUT UNIT | 1 | X2 | OPEN CHUCK #1 |
| A | INPUT UNIT | 1 | X5 | RETURN POSITION OF X-SHAFT OF ROBOT #1 |
| A | INPUT UNIT | 1 | X6 | TURN POSITION OF X-SHAFT OF ROBOT #1 |
| B | ADHESIVE APPLYING UNIT | 1 | X7 | FORWARD MOVEMENT POSITION OF X-SHAFT OF AH #1 |
| B | ADHESIVE APPLYING UNIT | 1 | X8 | BACKWARD MOVEMENT POSITION OF X-SHAFT OF AH #1 |
| C | OUTPUT UNIT | 1 | X10 | CLOSE CHUCK #2 |
| C | OUTPUT UNIT | 1 | X11 | OPEN CHUCK #2 |
| C | OUTPUT UNIT | 1 | X13 | WORK DETECTION #3 |
| C | OUTPUT UNIT | 1 | X14 | RETURN POSITION OF I-SHAFT OF ROBOT #2 |
| C | OUTPUT UNIT | 1 | X15 | TURN POSITION OF I-SHAFT OF ROBOT #2 |
| A | INPUT UNIT | 1 | Y1 | ORDER TO CLOSE CHUCK #1 |
| A | INPUT UNIT | 1 | Y2 | ORDER TO OPEN CHUCK #1 |
| A | INPUT UNIT | 1 | Y5 | COMMAND TO RETURN X-SHAFT OF ROBOT #1 |
| A | INPUT UNIT | 1 | Y6 | COMMAND TO TURN X-SHAFT OF ROBOT #1 |
| B | ADHESIVE APPLYING UNIT | 1 | Y7 | COMMAND TO MOVE FORWARD X-SHAFT |
| B | ADHESIVE APPLYING UNIT | 1 | Y8 | COMMAND TO MOVE BACKWARD X-SHAFT |
| B | ADHESIVE APPLYING UNIT | 1 | Y9 | DISPENSE COMMAND |
| C | OUTPUT UNIT | 1 | Y10 | ORDER TO CLOSE CHUCK #2 |
| C | OUTPUT UNIT | 1 | Y11 | ORDER TO OPEN CHUCK #2 |
| C | OUTPUT UNIT | 1 | Y12 | COMMAND TO RETURN I-SHAFT OF ROBOT #2 |
| C | OUTPUT UNIT | 1 | Y13 | COMMAND TO TURN I-SHAFT OF ROBOT #2 |

FIG. 6A

| PROCESS CODE | NAME | OPERATION STATE NUMBER | SIGNAL CODE | SIGNAL NAME | FIRST CYCLE | | SECOND CYCLE | |
|---|---|---|---|---|---|---|---|---|
| | | | | | ON | OFF | ON | OFF |
| A | INPUT UNIT | 1 | X1 | CLOSE CHUCK #1 | 0.251 | 0.564 | 0.253 | 0.574 |
| A | INPUT UNIT | 1 | X2 | OPEN CHUCK #1 | 0.734 | 0.122 | 0.724 | 0.130 |
| A | INPUT UNIT | 1 | X5 | RETURN POSITION OF X-SHAFT OF ROBOT #1 | ... | ... | ... | ... |
| A | INPUT UNIT | 1 | X6 | TURN POSITION OF X-SHAFT OF ROBOT #1 | ... | ... | ... | ... |
| B | ADHESIVE APPLYING UNIT | 1 | X7 | FORWARD MOVEMENT POSITION OF X-SHAFT OF AH #1 | ... | ... | ... | ... |
| B | ADHESIVE APPLYING UNIT | 1 | X8 | BACKWARD MOVEMENT POSITION OF X-SHAFT OF AH #1 | ... | ... | ... | ... |
| C | OUTPUT UNIT | 1 | X10 | CLOSE CHUCK #2 | ... | ... | ... | ... |
| C | OUTPUT UNIT | 1 | X11 | OPEN CHUCK #2 | ... | ... | ... | ... |
| C | OUTPUT UNIT | 1 | X13 | WORK DETECTION #3 | ... | ... | ... | ... |
| C | OUTPUT UNIT | 1 | X14 | RETURN POSITION OF I-SHAFT OF ROBOT #2 | ... | ... | ... | ... |
| C | OUTPUT UNIT | 1 | X15 | TURN POSITION OF I-SHAFT OF ROBOT #2 | ... | ... | ... | ... |
| A | INPUT UNIT | 1 | Y1 | ORDER TO CLOSE CHUCK #1 | ... | ... | ... | ... |
| A | INPUT UNIT | 1 | Y2 | ORDER TO OPEN CHUCK #1 | ... | ... | ... | ... |
| A | INPUT UNIT | 1 | Y5 | COMMAND TO RETURN X-SHAFT OF ROBOT #1 | ... | ... | ... | ... |
| A | INPUT UNIT | 1 | Y6 | COMMAND TO TURN X-SHAFT OF ROBOT #1 | ... | ... | ... | ... |
| B | ADHESIVE APPLYING UNIT | 1 | Y7 | COMMAND TO MOVE FORWARD X-SHAFT | ... | ... | ... | ... |
| B | ADHESIVE APPLYING UNIT | 1 | Y8 | COMMAND TO MOVE BACKWARD X-SHAFT | ... | ... | ... | ... |
| B | ADHESIVE APPLYING UNIT | 1 | Y9 | DISPENSE COMMAND | ... | ... | ... | ... |
| C | OUTPUT UNIT | 1 | Y10 | ORDER TO CLOSE CHUCK #2 | ... | ... | ... | ... |
| C | OUTPUT UNIT | 1 | Y11 | ORDER TO OPEN CHUCK #2 | ... | ... | ... | ... |
| C | OUTPUT UNIT | 1 | Y12 | COMMAND TO RETURN I-SHAFT OF ROBOT #2 | ... | ... | ... | ... |
| C | OUTPUT UNIT | 1 | Y13 | COMMAND TO TURN I-SHAFT OF ROBOT #2 | ... | ... | ... | ... |

| | N-th CYCLE | | ON TIMING | | OFF TIMING | | ON TIMING THRESHOLD VALUE | | OFF TIMING THRESHOLD VALUE | |
|---|---|---|---|---|---|---|---|---|---|---|
| ... | ON | OFF | AVERAGE | DEVIATION | AVERAGE | DEVIATION | UPPER LIMIT | LOWER LIMIT | UPPER LIMIT | LOWER LIMIT |
| ... | 0.248 | 0.583 | 0.252 | 0.003 | 0.578 | 0.006 | 0.270 | 0.234 | 0.614 | 0.542 |
| ... | 0.728 | 0.127 | 0.729 | 0.005 | 0.130 | 0.011 | 0.759 | 0.699 | 0.198 | 0.064 |
| ... | ... | ... | ... | ... | ... | ... | ... | ... | ... | ... |

FROM FIG. 6A

FIG. 7A

| PROCESS CODE | NAME | OPERATION STATE NUMBER | SIGNAL CODE | SIGNAL NAME | CONDITION TO BE JUDGED | JUDGMENT THRESHOLD VALUE | |
|---|---|---|---|---|---|---|---|
| | | | | | | UPPER LIMIT | LOWER LIMIT |
| A | INPUT UNIT | 1 | X1 | CLOSE CHUCK #1 | ON | 0.270 | 0.234 |
| A | INPUT UNIT | 1 | X1 | CLOSE CHUCK #1 | OFF | 0.614 | 0.542 |
| A | INPUT UNIT | 1 | X2 | OPEN CHUCK #1 | ON | 0.759 | 0.699 |
| A | INPUT UNIT | 1 | X2 | OPEN CHUCK #1 | OFF | 0.196 | 0.064 |
| A | INPUT UNIT | 1 | X5 | RETURN POSITION OF X-SHAFT OF ROBOT #1 | ON | ... | ... |
| A | INPUT UNIT | 1 | X5 | RETURN POSITION OF X-SHAFT OF ROBOT #1 | OFF | ... | ... |
| A | INPUT UNIT | 1 | X6 | TURN POSITION OF X-SHAFT OF ROBOT #1 | ON | ... | ... |
| A | INPUT UNIT | 1 | X6 | TURN POSITION OF X-SHAFT OF ROBOT #1 | OFF | ... | ... |
| B | ADHESIVE APPLYING UNIT | 1 | X7 | FORWARD MOVEMENT POSITION OF X-SHAFT OF AH #1 | ON | ... | ... |
| B | ADHESIVE APPLYING UNIT | 1 | X7 | FORWARD MOVEMENT POSITION OF X-SHAFT OF AH #1 | OFF | ... | ... |
| B | ADHESIVE APPLYING UNIT | 1 | X8 | BACKWARD MOVEMENT POSITION OF X-SHAFT OF AH #1 | ON | ... | ... |
| B | ADHESIVE APPLYING UNIT | 1 | X8 | BACKWARD MOVEMENT POSITION OF X-SHAFT OF AH #1 | OFF | ... | ... |
| C | OUTPUT UNIT | 1 | X10 | CLOSE CHUCK #2 | ON | ... | ... |
| C | OUTPUT UNIT | 1 | X10 | CLOSE CHUCK #2 | OFF | ... | ... |
| C | OUTPUT UNIT | 1 | X11 | OPEN CHUCK #2 | ON | ... | ... |
| C | OUTPUT UNIT | 1 | X11 | OPEN CHUCK #2 | OFF | ... | ... |
| C | OUTPUT UNIT | 1 | X13 | WORK DETECTION #3 | ON | ... | ... |
| C | OUTPUT UNIT | 1 | X13 | WORK DETECTION #3 | OFF | ... | ... |
| C | OUTPUT UNIT | 1 | X14 | RETURN POSITION OF I-SHAFT OF ROBOT #2 | ON | ... | ... |
| C | OUTPUT UNIT | 1 | X14 | RETURN POSITION OF I-SHAFT OF ROBOT #2 | OFF | ... | ... |
| C | OUTPUT UNIT | 1 | X15 | TURN POSITION OF I-SHAFT OF ROBOT #2 | ON | ... | ... |
| C | OUTPUT UNIT | 1 | X15 | TURN POSITION OF I-SHAFT OF ROBOT #2 | OFF | ... | ... |

FROM FIG. 7A

| A | INPUT UNIT | 1 | Y1 | ORDER TO CLOSE CHUCK #1 | ON | ... | ... |
|---|---|---|---|---|---|---|---|
| A | INPUT UNIT | 1 | Y1 | ORDER TO CLOSE CHUCK #1 | OFF | ... | ... |
| A | INPUT UNIT | 1 | Y2 | ORDER TO OPEN CHUCK #1 | ON | ... | ... |
| A | INPUT UNIT | 1 | Y2 | ORDER TO OPEN CHUCK #1 | OFF | ... | ... |
| A | INPUT UNIT | 1 | Y5 | COMMAND TO RETURN X-SHAFT OF ROBOT #1 | ON | ... | ... |
| A | INPUT UNIT | 1 | Y5 | COMMAND TO RETURN X-SHAFT OF ROBOT #1 | OFF | ... | ... |
| A | INPUT UNIT | 1 | Y6 | COMMAND TO TURN X-SHAFT OF ROBOT #1 | ON | ... | ... |
| A | INPUT UNIT | 1 | Y6 | COMMAND TO TURN X-SHAFT OF ROBOT #1 | OFF | ... | ... |
| B | ADHESIVE APPLYING UNIT | 1 | Y7 | COMMAND TO MOVE FORWARD X-SHAFT | ON | ... | ... |
| B | ADHESIVE APPLYING UNIT | 1 | Y7 | COMMAND TO MOVE FORWARD X-SHAFT | OFF | ... | ... |
| B | ADHESIVE APPLYING UNIT | 1 | Y8 | COMMAND TO MOVE BACKWARD X-SHAFT | ON | ... | ... |
| B | ADHESIVE APPLYING UNIT | 1 | Y8 | COMMAND TO MOVE BACKWARD X-SHAFT | OFF | ... | ... |
| B | ADHESIVE APPLYING UNIT | 1 | Y9 | DISPENSE COMMAND | ON | ... | ... |
| B | ADHESIVE APPLYING UNIT | 1 | Y9 | DISPENSE COMMAND | OFF | ... | ... |
| C | OUTPUT UNIT | 1 | Y10 | ORDER TO CLOSE CHUCK #2 | ON | ... | ... |
| C | OUTPUT UNIT | 1 | Y10 | ORDER TO CLOSE CHUCK #2 | OFF | ... | ... |
| C | OUTPUT UNIT | 1 | Y11 | ORDER TO OPEN CHUCK #2 | ON | ... | ... |
| C | OUTPUT UNIT | 1 | Y11 | ORDER TO OPEN CHUCK #2 | OFF | ... | ... |
| C | OUTPUT UNIT | 1 | Y12 | COMMAND TO RETURN I-SHAFT OF ROBOT #2 | ON | ... | ... |
| C | OUTPUT UNIT | 1 | Y12 | COMMAND TO RETURN I-SHAFT OF ROBOT #2 | OFF | ... | ... |
| C | OUTPUT UNIT | 1 | Y13 | COMMAND TO TURN I-SHAFT OF ROBOT #2 | ON | ... | ... |
| C | OUTPUT UNIT | 1 | Y13 | COMMAND TO TURN I-SHAFT OF ROBOT #2 | OFF | ... | ... |

PRODUCTION SYSTEM, AND METHOD OF PRODUCING ARTICLE

This application is a Continuation of U.S. patent application Ser. No. 16/522,546, filed on Jul. 25, 2019, which claims the benefit of Japanese Patent Application No. 2019-123147, filed Jul. 1, 2019, and Japanese Patent Application No. 2018-144010, filed Jul. 31, 2018, all of which are hereby incorporated by reference herein in their entirety.

BACKGROUND

Field of the Disclosure

The present disclosure relates to a production system configured to monitor whether a machine used in a production line is operating normally.

DESCRIPTION OF THE RELATED ART

In a production line including a plurality of machines controlled by a sequence control apparatus, if a failure due to degradation of a machine or the like occurs, the whole production line may stop until the failed machine is restored, which may cause a large production loss. To avoid such a situation, early prediction of a failure or early detection of degradation of a machine may be performed, and predictive maintenance may be performed before a failure occurs. To this end, it has been proposed to monitor an operation state of a machine (for example, timing of starting the operation of the machine) and automatically detect a difference from a normal operation and notify a user of the detected difference.

However, even a normal operation may have a certain variation in operating time. The variation may be different from one machine to another.

For example, Japanese Patent No. 5021547 discloses a technique in which operation timing is measured for each of devices of an automated machine in a normal operation, and reference timing data is produced. Actual operation timing is detected and compared with the reference timing data.

In production lines, to reduce cost, there is a trend to control many machines by using one control apparatus. However, in a production line, a part is not supplied from a present process to a next process until an operation in the present process is completed. Therefore, if a trouble occurs in a certain process, a machine in a following process is not allowed to operate. In many control systems, a machine starts to operate when a part is supplied to the machine. Therefore, all machines do not necessarily start to operate at the same timing.

To monitor whether operations are normal or not for each of machines which are different in operation start timing based on an ON/OFF time of each machine as in the technique disclosed in Japanese Patent No. 5021547, it is necessary to previously provide a measurement standard for each signal.

However, in the technique disclosed in Japanese Patent No. 5021547, as the number of machines and/or the number of signals controlled by a single control apparatus increase, the amount of operation necessary to provide the measurement standard for each signal increases, and thus a great increase occurs in the amount of work performed manually.

SUMMARY

In an aspect, the present disclosure provides a production system configured to produce an article via at least a first process and a second process, including a control unit configured to control the first process operated repeatedly while having a waiting time between repetitions and control the second process operated repeatedly while having a waiting time between repetitions, a first sensor configured such that a value changes in response to an operation of the first process, and a second sensor configured such that a value changes in response to an operation of the second process, wherein the control unit compares a first time period from a beginning of an operation of the first process to an occurrence of a change in the value of the first sensor with a predetermined first threshold value, and compares a second time period from a beginning of an operation of the second process to an occurrence of a change in the value of the second sensor with a predetermined second threshold value.

In an aspect, the present disclosure provides a method of producing an article using the production system described above.

Further features of the present disclosure will become apparent from the following description of exemplary embodiments with reference to the attached drawings.

BRIEF DESCRIPTION OF THE DRAWINGS

FIGS. 3A to 3C are operation timing charts according to one or more aspects of the present disclosure.

FIG. 4 is a diagram illustrating a signal in use list according to one or more aspects of the present disclosure.

FIGS. 6A and 6B are diagrams illustrating a measurement result according to one or more aspects of the present disclosure.

FIGS. 7A and 7B are diagrams illustrating a judgment condition according to one or more aspects of the present disclosure.

DESCRIPTION OF THE EMBODIMENTS

Figure 1:
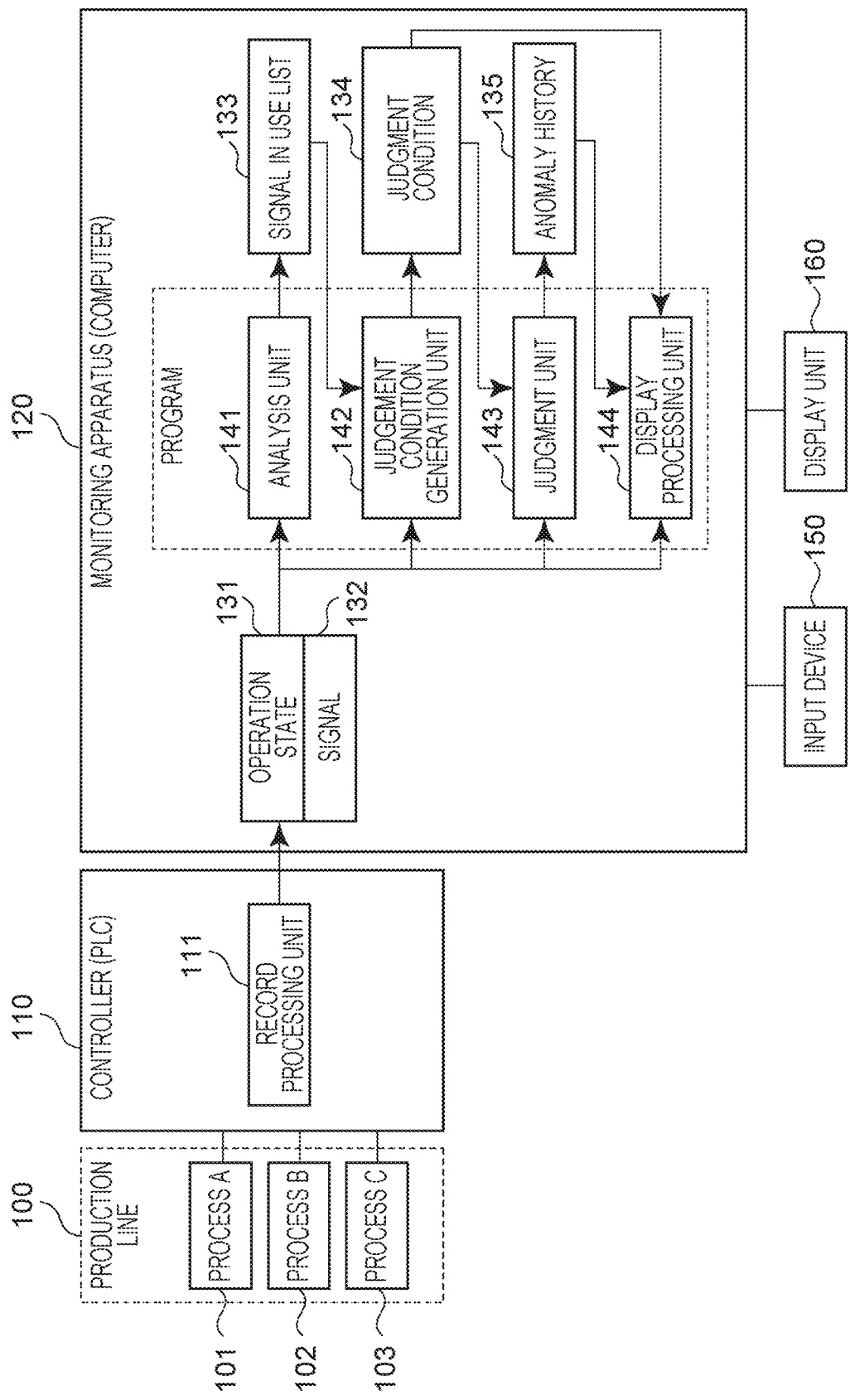
FIG. 1 is a block diagram illustrating a system configuration according to one or more aspects of the present disclosure.

Referring to FIG. 1, an embodiment of the present disclosure is described below.

In a production line 100, an article is produced via production processes 101 to 103 performed by a plurality of machines operable independently of each other. Each apparatus, which performs corresponding one of the processes 101 to 103, includes a plurality of sensors, a pneumatic device, a robot, and/or the like. Each of the processes 101 to 103 is controlled by controlling each corresponding apparatus using a control unit. More specifically, for example, each process is controlled by sequence control using a single programmable logic controller (PLC) 110. The programmable logic controller (PLC) 110 may be a control apparatus or a controller. In the present disclosure, the control unit, the PLC, the control apparatus, or the controller configured to control machines used in each of the processes 101 to 103 is referred to as the control unit.

A monitoring apparatus 120 is realized, for example, by installing a program on a general-purpose computer. The monitoring apparatus 120 may include a processor (CPU), a memory, and a large-capacity non-volatile storage apparatus such as a magnetic disk apparatus. The monitoring apparatus 120 may further include a display unit 160 such as a display, and an input device 150 such as a mouse and/or a keyboard. In FIG. 1, by way of example, but not limitation, the monitoring apparatus 120 is provided separately from the controller 110. The monitoring apparatus 120 may be part of a computer by which the controller 110 is realized, or the monitoring apparatus 120 and the controller 110 may be realized in the same one control unit. In the present disclosure, because the monitoring apparatus 120 may be part of the computer by which the controller 110 is realized, the monitoring apparatus 120 in FIG. 1 may also be referred to as a monitoring unit or a control unit. In the present disclosure, the production line 100, the controller 110, and the monitoring apparatus 120 are, as a whole, referred to as a production system.

In FIG. 1, a record processing unit 111 in the controller 110 reads out a current value of a signal indicating an operation state and/or a current value of a signal or the like associated with each apparatus in each process from a storage unit (also referred to as a memory) in synchronization with an operation clock of a PLC 110, and transmits the read values to the monitoring apparatus. The monitoring apparatus receives the transmitted operation state and/or signal associated with each apparatus in each process and stores, in the storage unit, as an operation state 131 or a signal 132. In a case where the monitoring apparatus is realized as a monitoring unit disposed in the same computer in which the controller is realized as described above, it is not necessary to transmit/receive the values, but signals indicating operation status of respective processes and/or signals or the like stored in the storage unit provided in the controller may be directly used. The operation state of each apparatus in each process is stored as the operation state 131 at predetermined time intervals or timings, for example, such that 1 is employed as a value when an apparatus in a process of interest (101 to 103) is in operation while 0 is employed as a value when an apparatus in a process of interest is in a waiting state. As for the signal 132, a control signal used by the controller 110 to control each machine used in each of processes 101 to 103 is stored at predetermined time intervals or timings. A control signal is used by a sensor provided on each machine operating in each of processes 101 to 103 to notify the controller 110 that a work is detected, or is used by the controller 110 to instruct each machine used in each of the processes 101 to 103 to start to operate. For example, when a sensor detects a work, a value of 1 is stored in the storage unit (also referred to as the memory) of the controller, but when no work is detected, a value of 0 is stored. The values are read out by the record processing unit 111 of the controller 110 and transmitted to the monitoring apparatus. The monitoring apparatus stores each received signal as the signal 132 in the storage unit.

The operation state 131 and the signal 132 stored in the storage unit of the monitoring unit for each apparatus in each process is further described below with reference FIG. 2 and FIGS. 3A to 3C.

Figure 2:
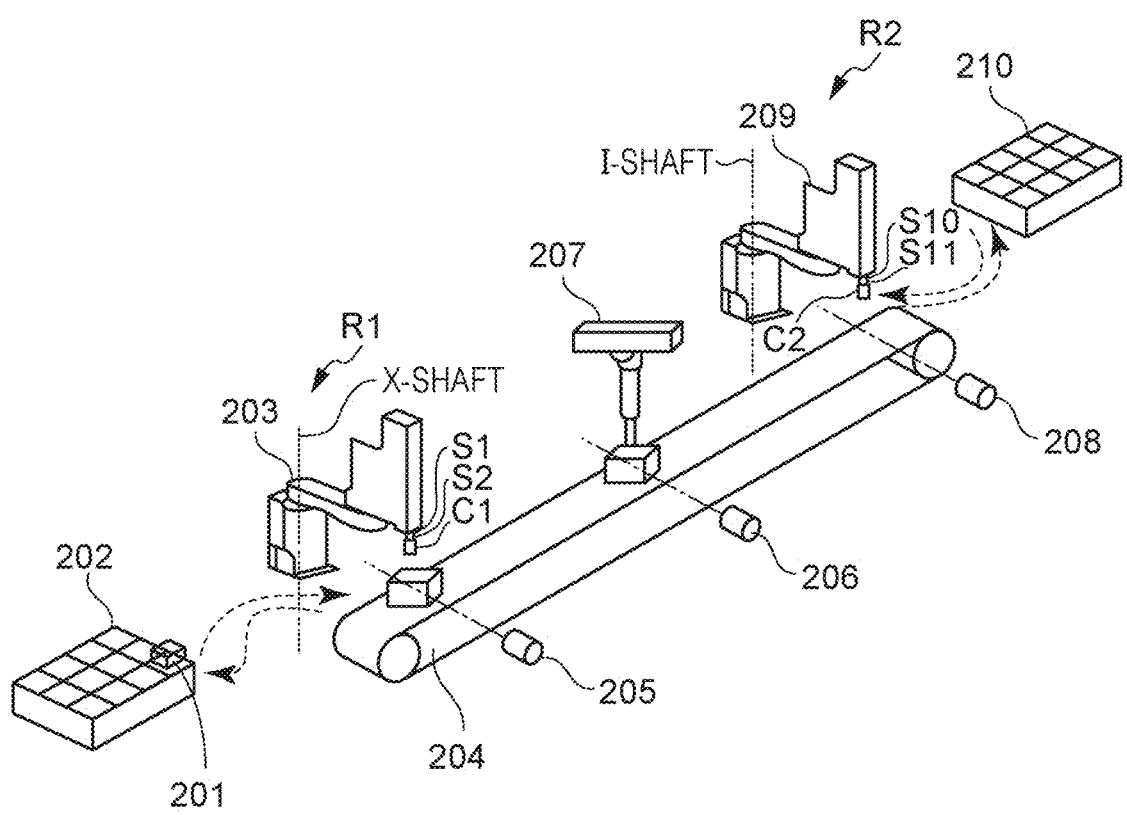
FIG. 2 is a diagram illustrating a configuration of a production line according to one or more aspects of the present disclosure.

FIG. 2 is a simplified illustration of a production line. Each apparatus in each process has an input unit 203, an adhesive applying unit 207, and an output unit 209, and works subjected to the respective production processes are conveyed by a conveyor 204. In the example shown in FIG. 2, units are controlled by a single controller. The input unit 203, the adhesive applying unit 207, and the output unit 209 shown in FIG. 2 respectively correspond to the process A (first process) 101, the process B (second process) 102, and the process C (third process) 103 shown in FIG. 1.

Figure 3C:
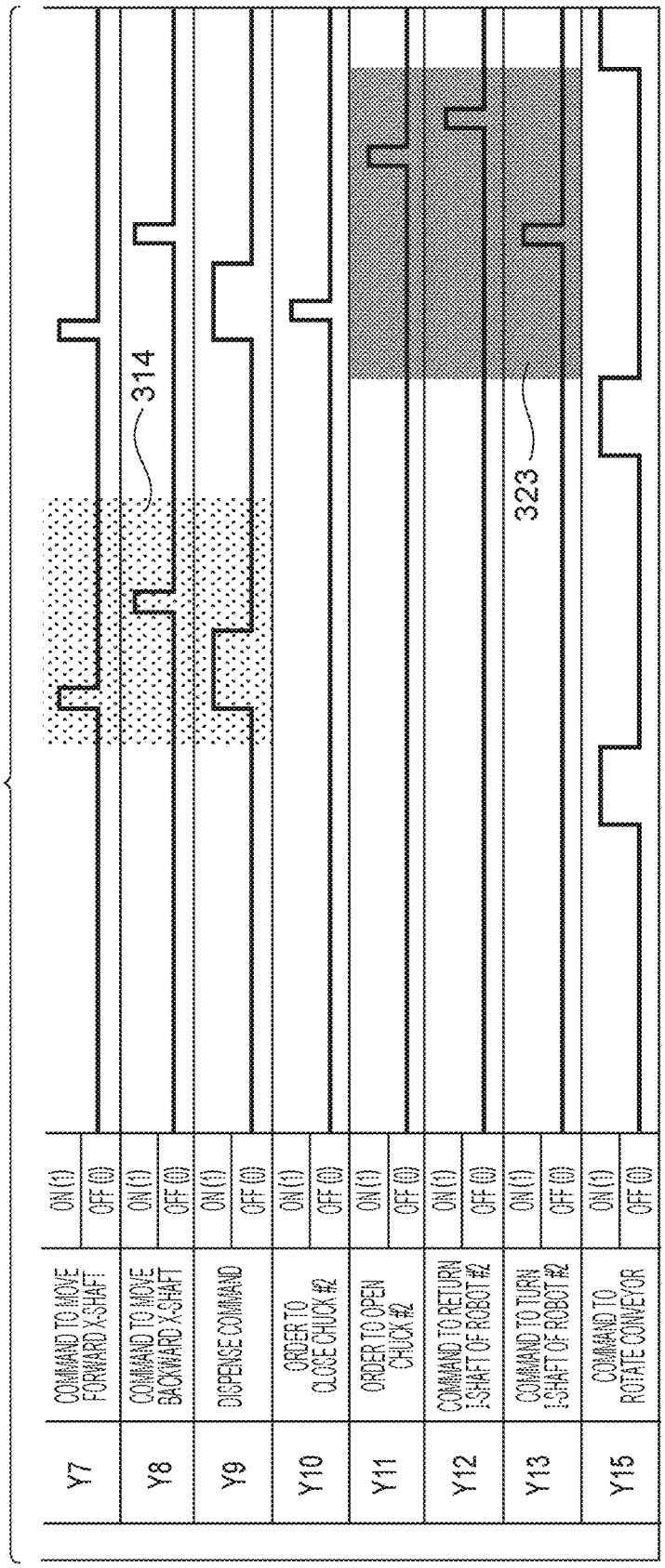

FIGS. 3A to 3C are operation timing charts illustrating an operation state of each unit in the production line shown in FIG. 1. On the left-hand side of the figures, process codes 1 to 3, names of machines (units) used in these processes, and states (operation states or waiting states) thereof are shown. Below those shown are signals X1 to X15 and Y1 to Y15 indicating the operation states of the machines, the names of these signals, and states of the signals. On the right side thereof, shown are a timing chart indicating states of the machines and the signals. A horizontal axis of the timing chart represents passage of time.

The operation of each apparatus in each process controlled by the sequence control using the single controller 110 is described below with reference to the operation timing chart shown in FIGS. 3A to 3B. First, when an input pallet 202 is set, the input unit 203 in the waiting state starts to operate. That is, the input unit 203 goes into an in-operation state. That is, the input unit 203 in the waiting state starts to operate. That is, the process A goes into an in-operation state. In FIG. 3A, the states of the input unit of the process A has a transition from the waiting state (0) to the in-operation state (1) (301 in FIG. 3A). In response to this transition, a value 1 of a signal indicating that the process A is in the in-operation state and its start time are stored in a memory of the controller. In the present embodiment, the timing of the transition of the state of the process A from the waiting state to the in-operation state is given, by way of example, but not limitation, by the timing of setting the input pallet. Alternatively, for example, the transition of the state of the process A from the waiting state to the in-operation state may be made when a particular passage of time occurs from the transition of the state of the input unit from the in-operation state (1) to the waiting state (0).

When the process A (the input unit 203) comes in the in-operation state, a command signal is issued to close a chuck C1 disposed on the input unit 203 and functioning to hold a work (that is, the signal Y1 in FIG. 3B changes from 0 to 1). At the same time, a signal value of 1 of the command signal Y1 and an issuing time of the command signal Y1 are stored in the memory of the controller. When the command signal Y1 to close the chuck C1 is issued, the chuck C1 closes and holds a work 201 on the pallet. The closed state of the chuck C1 is detected by a sensor S1 configured to detect the closed state of the chuck C1. That is, the signal code X1 of the signal of the sensor S1, the value of the signal indicating the states of the chuck C1 (from 0 to 1 (OFF to ON)) indicating that the chuck C1 is closed, and the detection time thereof are stored in the memory of the controller.

When the closed state of the chuck C1 is detected, a command signal is issued to turn an X-shaft of a robot R1 functioning as the input unit 203. More specifically, a pulse signal changing from 0 to 1 functioning as the command signal with a code Y6 is issued, and the value 1 of this signal and the issuing time of this command signal are stored in the memory of the controller. In response to the issuing of the command signal, the robot R1 turns and thus the work 201 is moved onto a conveyor 204. A sensor S6 (not shown) detects whether the turn position of the robot R1 is correct or not. When the sensor S6 detects that the turn position of the robot R1 is correct (the sensor S6 outputs the signal with a signal code X6 of a value of 1), the value 1 of the signal and the detection time thereof are stored in the memory of the controller. In response to detecting that the turn position of the robot R1 is correct, a command signal to open the chuck C1 is issued (a command signal with a code Y2, in the form of a pulse signal, changes from 0 to 1). Thus, the value 1 of the command signal and the issuing time of the command signal are stored in the memory of the controller. In response to the issuing of the command signal, the chuck C1 opens and the work 201 is put on a conveyor 204. When a sensor S2, provided to detect the open state of the chuck C1, detects that the chuck C1 is open, the value of the signal with a signal code of X2 output by the sensor S2 becomes 1, and the value 1 of the signal and the detection time thereof are stored in the memory of the controller. In response to detecting that the chuck C1 is open, a sensor 205 of a work detection unit W1 detects whether the work 201 exists on the conveyor 204 or not. When the sensor 205 detects that a work 201 exists on the conveyor 204, the value of the signal with a signal code X3 output by the sensor 205 becomes 1, and the value 1 of the signal and the detection time thereof are stored in the memory of the controller. In response to detecting the existence of the work 201, a command signal is issued to turn the X-shaft of the robot R1. That is, the value of the command signal with a signal code Y5 in the form of a pulse signal changes from 0 to 1, and the value 1 of this signal and the issuing time of this command signal are stored in the memory of the controller. In response to the issued command signal, the robot R1 turns until a return position is reached. A sensor S5 (not shown) detects whether the return position of the robot R1 is correct or not. When the sensor S5 detects that the return position of the robot R1 is correct (the value of the signal with a signal code of X5 output by the sensor S5 becomes 1), the value 1 of the signal and the detection time thereof are stored in the memory of the controller. In response to detecting that the return position of the robot R1 is correct, the input unit 203 goes into the waiting state, and the value of a signal indicating the state of the input unit 203 becomes 0. This value and a detection time thereof are stored in the memory of the controller. That is, in FIG. 3A, the state of the input unit of the process A has a transition from the in-operation state (1) to the waiting state (0) (301 in FIG. 3A).

When the sensor 205 of the work detection unit W1 detects the work 201 put on the conveyor, the conveyor 204 is driven to convey the work 201. When a sensor 206 of a work detection unit W2 detects the work 201, the value of a signal with a signal code X9 output from the sensor 206 becomes 1, and the conveyor stops. The value 1 of the signal and the detection time thereof are stored in the memory of the controller.

Furthermore, in response to detecting the work 201 by the sensor 206 of the work detection unit W2, the input unit 203 in the waiting state restarts to operate, and the value of the signal indicating the state of the input unit 203 changes from 0 to 1. That is, in FIG. 3A, the state of the process A (the input unit) has a transition from the waiting state (0) to the in-operation state (1) (302 in FIG. 3A), and the value 1 of this signal and the detection time thereof (operation start time) are stored in the memory of the controller, and the operation described above is repeated.

Furthermore, the adhesive applying unit 207 in the waiting state starts to operate. That is, the process B goes into an in-operation state. That is, in FIG. 3A, the state of the adhesive applying unit of the process code B has a transition from the waiting state (0) to the in-operation state (1) (311 in FIG. 3A). The value of a signal indicating the state of the process B (the adhesive applying unit 207) becomes 1 to indicate that the process B is in the in-operation state, and the value 1 of this signal and the detection time thereof (the operation start time) are stored in the memory of the controller. Furthermore, in response to detecting the work 201, a command signal is issued to move forward the dispenser of the adhesive applying unit 207 along the X-axis. That is, a signal with a value of 1 is output as the command signal with a signal code of Y7. Furthermore a command signal is issued to discharge an adhesive from the dispenser, that is, a signal with a value of 1 is output as the command signal with a signal code of Y9. The values of 1 of the command signals and the issuing time of the command signals are stored in the memory of the controller. As a result, the dispenser of the adhesive applying unit moves the X-shaft forward while discharging the adhesive thereby applying the adhesive to the work 201. A sensor S7 (not shown) provided to detect the forward movement position of the X-shaft detects the dispenser, and a signal with a value of 1 is output as the signal with a signal code X7 from the sensor S7. The value of 1 of this signal and the detection time thereof are stored in the memory of the controller. When the sensor S7 detects the dispenser, the value of the command signal Y9 for controlling the discharging from the dispenser has a transition from 1 indicating that discharging is to be performed to 0 indicating that the discharging is to be stopped. When the value of the command signal changes from 1 to 0, the signal value of 0 and the time of transition to 0 are stored in the memory of the controller. Furthermore, a command signal is issued to move the X-shaft backward. That is, a signal with a value of 1 is output as the command signal with a signal code of Y8, and the value 1 of this signal and the issuing time of this command signal are stored in the memory of the controller. In response, the dispenser of the adhesive applying unit moves backward along the X-axis. When a sensor S8 (not shown) provided to detect the backward position of the X-shaft detects the dispenser, a signal with a value of 1 is output as a signal with a signal code X8 from the sensor S8, and the value of 1 of this signal and the detection time thereof are stored in the memory of the controller. In response, the adhesive applying unit 207 goes into a waiting state, and the value a signal indicating the state of the adhesive applying unit 207 (the process B) becomes 0 to indicate that the adhesive applying unit 207 is in the waiting state. This value and the detection time thereof are stored in the memory of the controller. In FIG. 3A, the state of the process B (the adhesive applying unit) has a transition from the in-operation state (1) to the waiting state (0) (311 in FIG. 3A).

When the process B and the process A both come into the waiting state, the conveyor 204 is driven to convey the work 201. When a sensor 208 of a work detection unit W3 detects the work 201, that is, when the value of the signal with a signal code of X13 output from the sensor 208 becomes 1, the value of 1 of this signal and the detection time thereof are stored in the memory of the controller. At the same time, the sensor 206 of the work detection unit W2 may also detect a work. If the sensor 206 detects the work, the value of the signal with the signal code X9 output from the sensor 206 becomes 1, and the value of 1 of this signal and the detection time thereof are stored in the memory of the controller. In response, the conveyor stops.

When the sensor 208 of the work detection unit W3 detects the work 201, the process A in the waiting state restarts the operation. In FIG. 3A, the state of the input unit of the process A has a transition from the waiting state (0) to the in-operation state (1) (303 in FIG. 3A). The value of 1 indicating that the process A (the input unit 203) is in the in-operation state and the time thereof (the operation start time) are stored in the memory of the controller. The operation described above is repeated. As described above, the process A is operated repeatedly while having a waiting time between repetitions of the process A. That is, the operation is restarted after each waiting time.

In response, the process B in the waiting state starts to operation. That is, the adhesive applying unit 207 goes into the in-operation state. In FIG. 3A, the state of the adhesive applying unit of the process code B has a transition from the waiting state (0) to the in-operation state (1) (312 in FIG. 3A). At the same time, the value 1 of this signal associated with the process B (the adhesive applying unit 207) and the detection time thereof (operation start time) are stored in the memory of the controller, and the operation described above is repeated. As described above, the process B is performed repeatedly while having a waiting time between repetitions. That is, the operation is restarted after each waiting time.

When the sensor 208 of the work detection unit W3 detects a work, the process C (the output unit 209) in a waiting state starts to operate. A value of a signal indicating that the process C (the output unit 209) is in operation (1 in the present embodiment) and the time thereof (the operation start time) are stored in the memory of the controller.

In response, the output unit 209 in a waiting state starts to operate. That is, the process C comes into the in-operation state. In FIG. 3A, the state of the output unit 209 of the process code C has a transition from the waiting state (0) to the in-operation state (1) (321 in FIG. 3A), and the value of 1 of a signal indicating the state of the process C and the detection time thereof are stored in the memory of the controller. Furthermore, a command signal is issued to close the chuck C2 of the output unit 209. That is, a signal with a value of 1 is issued as the command signal with a signal code of Y10, and the value 1 of the signal and the detection time thereof are stored in the memory of the controller. In response, the chuck C2 closes and holds the work 201 on the conveyor. When a sensor S10 provided to detect the closed state of the chuck C2 detects that the chuck 2 is in the closed state, the value of the signal, denoted by a signal code X10, output from the sensor S10 becomes 1 and the value 1 of the signal and the detection time thereof are stored in the memory of the controller. Furthermore, a command signal is issued to turn an I-shaft of a robot R2 functioning as the output unit 209. That is, a signal with a value of 1 is issued as the command signal denoted by a signal code Y13, and the value 1 of this signal and the issuing time of this command signal are stored in the memory of the controller. In response, the I-shaft of the robot R2 turns to move the work 201 onto an output pallet 210. When a sensor S15 (not shown), provided to detect whether the turn position of the robot R2 is correct or not, detects that the turn position is correct, the value of a sensor signal denoted by a signal code X15 becomes 1, and the value 1 of this signal and the detection time thereof are stored in the memory of the controller. In response, a command signal to open the chuck C2 is issued. That is, a signal with a value of 1 is issued as the command signal denoted by a signal code Y11, and the value 1 of this signal and the issuing time of this command signal are stored in the memory of the controller. In response, the chuck C2 opens and thus the work 201 is put on the output pallet 210. When the open state of the chuck C2 is detected by a sensor S11 provided to detect the open state of the chuck C2, the sensor S11 outputs a signal with a value of 1 as a sensor signal denoted by a signal code of X11, and the value 1 of the signal and the detection time thereof are stored in the memory of the controller. In response, a command signal is issued to turn the I-shaft of the robot R2. That is, a signal with a value of 1 is issued as the command signal denoted by a signal code Y12, and the value 1 of this signal and the issuing time of this command signal are stored in the memory of the controller. In response, the I-shaft of the robot R2 turns until the return position is reached. When a sensor S14 (not shown) provided to detect whether the return position of the robot R2 is correct or not detects that the return position is correct, the sensor S14 outputs a signal with a value of 1 as a sensor signal denoted by a signal code X14, and the value 1 of the signal and the detection time thereof are stored in the memory of the controller. In response, the process C (the output unit 209) goes into a waiting state. That is, in FIG. 3A, the state of the output unit 209 of the process code C has a transition from the in-operation state (1) to the waiting state (0) (321 in FIG. 3A), and the value of 0 indicating the state of the associated with the process C (the output unit 209) and the detection time thereof are stored in the memory of the controller.

In the present embodiment, one cycle denotes a period in which each process (the process A, the process B, the process C) performs adhesion or conveying on a part (work) of an article to be produced.

When the production line starts the operation in a state in which there is no work on the conveyor, only the process A (the input unit 203) operates in a first cycle. In a second cycle, the process A (the input unit 203) and the process B (the adhesive applying unit 207) operate. In a third cycle, all units and processes including the process A (the input unit 203), the process B (the adhesive applying unit 207), and the process C (the output unit 209) operate.

In cycles after the third cycle, all units operate until there is no more work in the input pallet 202. When no more work exists in the input pallet 202 in a certain cycle, the input unit 203 no longer operates (the waiting time becomes longer than a predetermined value). In a next cycle, no work is supplied to the adhesive applying unit 207, and thus the adhesive applying unit 207 does not operate. In a further next cycle, no work is supplied to the output unit 209, and the output unit 209 does not operate (the waiting time becomes longer than a predetermined value).

In a case where there is initially N works in the input pallet, an N-cycle operation is performed until no work exists in the input pallet and no unit is in operation (the waiting time becomes longer than a predetermined value). That is, each apparatus in each process is operated repeatedly while having a waiting time between repetitions. In other words, each apparatus in each process restarts the operation after each waiting time.

The record processing unit 114 of the controller 110 reads out a value of a signal indicating an operation state and a value of a signal associated with each apparatus in each process from memory of the controller 110 synchronization with the operation clock of the controller 110, and transmits the read signals to the monitoring apparatus. The monitoring apparatus receives the transmitted operation state signal and the signal associated with each apparatus in each process and stores, in the storage unit, as the operation state 131 or the signal 132. In the production line shown in FIG. 2, the input pallet is set in a state in which there is no work on the conveyor 303. The operation state 131 and the signal 132 associated with each apparatus in each process are recorded until no more work exists in the input unit and any unit no longer operates (the waiting time becomes longer than the predetermined value).

Using the recorded operation state 131 and the signal 132 associated with each process, the monitoring apparatus 120 monitors the machines as described below with reference to FIG. 1, FIG. 2, and FIGS. 3A to 3C.

The monitoring apparatus 120 has a program to produce a condition of monitoring the machine of each apparatus in each process and a program to monitor the machine of each apparatus in each process. First, the program for producing the condition of monitoring the machine of each apparatus in each process is described. The program for producing the condition of monitoring the machine of each apparatus in each process includes an analysis unit 141 and a judgment condition generation unit 142.

The role of the analysis unit 141 is to automatically determine which signal is used by the machine in each apparatus in each process in the production line. More specifically, from the operation state 131 and the signal 132 associated with each apparatus in each process stored in the storage unit of the monitoring unit, the analysis unit 141 automatically determines the signal used in each apparatus in each process in the in-operation state in the production line 100, and the analysis unit 141 stores a result as a signal in use list 133.

In the production line, operations are sequentially performed on works, and thus the number of machines which start to operate increases stepwise and progressively until works arrive at all machines having no works before. That is, using the fact that when machines sequentially start to operation, the values of signals corresponding to the machines sequentially change from a value indicating a waiting state to a value indicating an operation state, signals used in each apparatus in each process are detected.

First, for example, when an operator inputs an instruction to the monitoring apparatus 120 using an input unit (not shown), the analysis unit 141 starts to operate. First, the analysis unit 141 prompts the operator to input an analysis period. In this situation, for example, a work is input to the production line which has no works yet and in which all apparatuses in processes are in the waiting state (as indicated by signals associated with the respective processes), and the operator inputs a value specifying a period including a period till a time when a completed article is output. The analysis unit 141 reads out the operation state 131 and the signal 132 associated with each apparatus in each process for the specified period, and extracts necessary data and starts analysis.

When an operation state 131 of an apparatus in a process has a constant value over a particular period, the analysis unit 141 determines that the process is in a particular operation state in this particular period. FIGS. 3A to 3C are graphs indicating recorded values of the operation state 131 and the signal 132 associated with each apparatus in each process. More specifically, process codes and signal codes are plotted along a vertical axis, and time is plotted along a horizontal axis, and signals of the respective process codes and signals of the respective signal codes are plotted time-sequentially.

In FIGS. 3A to 3C, 301, 302, and 303 represent time periods in which an input unit of a process code A is in an in-operation state. 301 represents a first-time operating time period, 302 represents a second-time operating time period, and 303 represents a third-time operating time period. Similarly, 311 and 312 represent time periods in which an adhesive applying unit of a process code B is in an in-operation state. 311 represents a first-time operating time period, and 312 represents a second-time operating time period. 321 represent a time period in which an output unit of a process code C is in an in-operation state. 321 represents a first-time operating time period. Note that the operating time period is a period from a time at which a transition occurs from the waiting state (0) to the in-operation state (1) to a time at which a transition occurs from the in-operation state (1) to the waiting state (0).

The analysis unit 141 extracts a signal whose value indicating the operation state changes between the ON (1) and the OFF (0) in the same operating time period for the same process code, and employs a signal code of the extracted signal as a signal code used in this process. Thus, the analysis unit 141 produces a signal in use list 133 such as that shown in FIG. 4.

When all processes (process codes A to C) are in operation as in the case of the first-time operating time period 321 of the process code C (the output unit) shown in FIG. 3A, it may not be easy to detect, from signals associated with the respective processes, a signal of a machine used in a particular process. However, using the fact that a progressive and stepwise increase occurs in the number of machines used in processes that start to operate, it is possible to correctly detect a signal code of a signal associated with the particular process.

More specifically, for example, in the first-time operating time period of the process code A (the input unit 203) denoted by 301 in FIG. 3A, only the process code A (the input unit) is in operation. When a particular signal is detected to change in value between ON (1) indicating the in-operation state and OFF (0) indicating the waiting state in this period, it can be determined that this particular signal is a signal associated with the input unit. A change in signal value indicating the operation state between ON (1) and the OFF (0) in the first-time operating time period 301 of the process code A (the input unit) in FIG. 3A occurs in a zone 304 (FIG. 3A) and a zone 305 (FIG. 3B). That is, it can be determined that signals with signal codes X1, X2, X3, X5, X6, Y1, Y2, Y5, and Y6 are signals used in the process A (the input unit 203). In the second-time operating time period of the process code A (the input unit) denoted by 302, not only the process A (the input unit 203) but also the process B (the adhesive applying unit 207) is in operation. Based on differences from the first-time operating time period 301 in which only the process code A (the input unit 203) is in operation, it is possible to detect signals used in the process code B (the adhesive applying unit 207) as follows. That is, signals to be detected have no change in signal value between ON (1) and OFF (0) in the operating time period 301, but the signals have a change in value indicating the operation state between ON (1) and OFF (0) in the operating time period 311. It can be determined that these detected signals are signals used in the process code B (the adhesive applying unit 207). That is, such signals are detected in a zone 313 and a zone 314. Thus, signals with signal codes X7, X8, X9, Y7, Y8, and Y9 are signals associated with the adhesive applying unit 207.

Similarly, based on differences in signal between the first-time operating time period 321 of the process code C (the output unit) and the second-time operating time period 302 of the process code A (the input unit), it is possible to detect signals used in the process code C (the output unit 209). More specifically, by detecting signals having no change in value indicating the operation state between ON (1) and OFF (0) in the operating time period 302 but having a change between ON (1) and OFF (0) in the operating time period 321, it is possible to detect signals used in the process code C (the output unit 305). That is, signals whose value indicating the operation state changes between ON (1) and OFF (0) are found in a zone 322 and a zone 323, and thus signals with signal codes X10, X11, X13, X14, X15, Y10, Y11, Y12, and Y13 are detected.

The relationship, determined in the above-described manner, between the operation state of the processes and signals are stored as the signal in use list 133. FIG. 4 illustrates an example of a signal in use list 133 according to the present embodiment.

As described above, signals used by the machines in the in-operation state are detected based on the fact that the number of machines operating in the production line increases progressively and stepwise, and a signal used for a particular machine has a change in signal value between ON and OFF only when this particular machine is in operation.

Alternatively, the period specified by the operator and input to the analysis unit 141 may a period from a state in which all processes of the production line are in operation (all processes have their works) to a state in which all works have been output. In this case, the number of machines in operation decreases stepwise and progressively in a period from the state in which all processes of the production line are in operation (all processes have their works) to a state in which all works have been output via states in which inputting of works to the processes is successively stopped. By using data acquired in this period, it is also possible to detect signals associated with the respective apparatus used in corresponding processes as in the case where data is acquired in the manner described above with reference to FIGS. 3A to 3C. Thus, as described above, the operator may input values to the analysis unit 141 to specify the period from a state in which all processes of the production line are in operation (all processes have their works) to a state in which all works have been output after inputting of works is stopped.

In the production line, in some cases, a plurality of machines may operate at the same timing. For example, this situation may occur in a case where the production line includes not only one but two adhesive applying units 304, and adhesives are applied to one work at the same time by the two adhesive applying units 304. In this case, the method described above allows it to detect a signal is used by a first adhesive applying unit or a second adhesive applying unit. However, the method does not allow it to determine whether the signal is used by the first adhesive applying unit or the second adhesive applying unit.

In such a case where a plurality of machines operate at the same timing, signals may be detected correctly, for example, by a method described below.

There can be a slight difference in ON/OFF timing among sensors (S1, S2, 205, S5, S6, S7, S8, 206, S10, S11, 208, S14, and S15) due to various factors such as a response speed, a control signal transmission time, a sliding friction of a machine, and/or the like. Even the same machine does not necessarily operate at the same timing. When machines operate using signals, ON-OFF transitions in the operation states of the machines occur in response to ON signals of sensors. Therefore, in general, the difference between the end timing of an in-operation state and a signal ON timing is rather small. This allows it to narrow down candidate machines. A time period denoted by 331 in FIG. 3A, that is, a time period from a time at which a signal turns on to a time at which an in-operation state ends is measured for a plurality of cycles, and it is determined that a machine indicating a smallest deviation in the measured time period is a machine using the signal. This makes it possible to correctly detect signals used by respective machines based on the operation states of the respective machines even when the operation timings are similar among the machines.

Next, a method of producing a monitoring condition for a machine is described below with reference to FIG. 1, FIG. 4, FIG. 5, and FIGS. 6A and 6B.

When an operator issues a judgment condition generation instruction to the judgment condition generation unit 142 shown in FIG. 1, the monitoring condition starts to generate a monitoring condition. The judgment condition generation unit 142 refers to the signal in use list such as that shown in FIG. 4 and generates the judgment condition such as that shown in FIGS. 7A and 7B. The process of generating the judgment condition is described in further detail below.

A plurality of judgment conditions may be defined in each row of the signal in use list. An example of a method of judging whether a signal is normal or abnormal is described below. In this method, the judgment condition is defined using an ON timing and an OFF timing of a signal according to the present embodiment.

Figure 5:
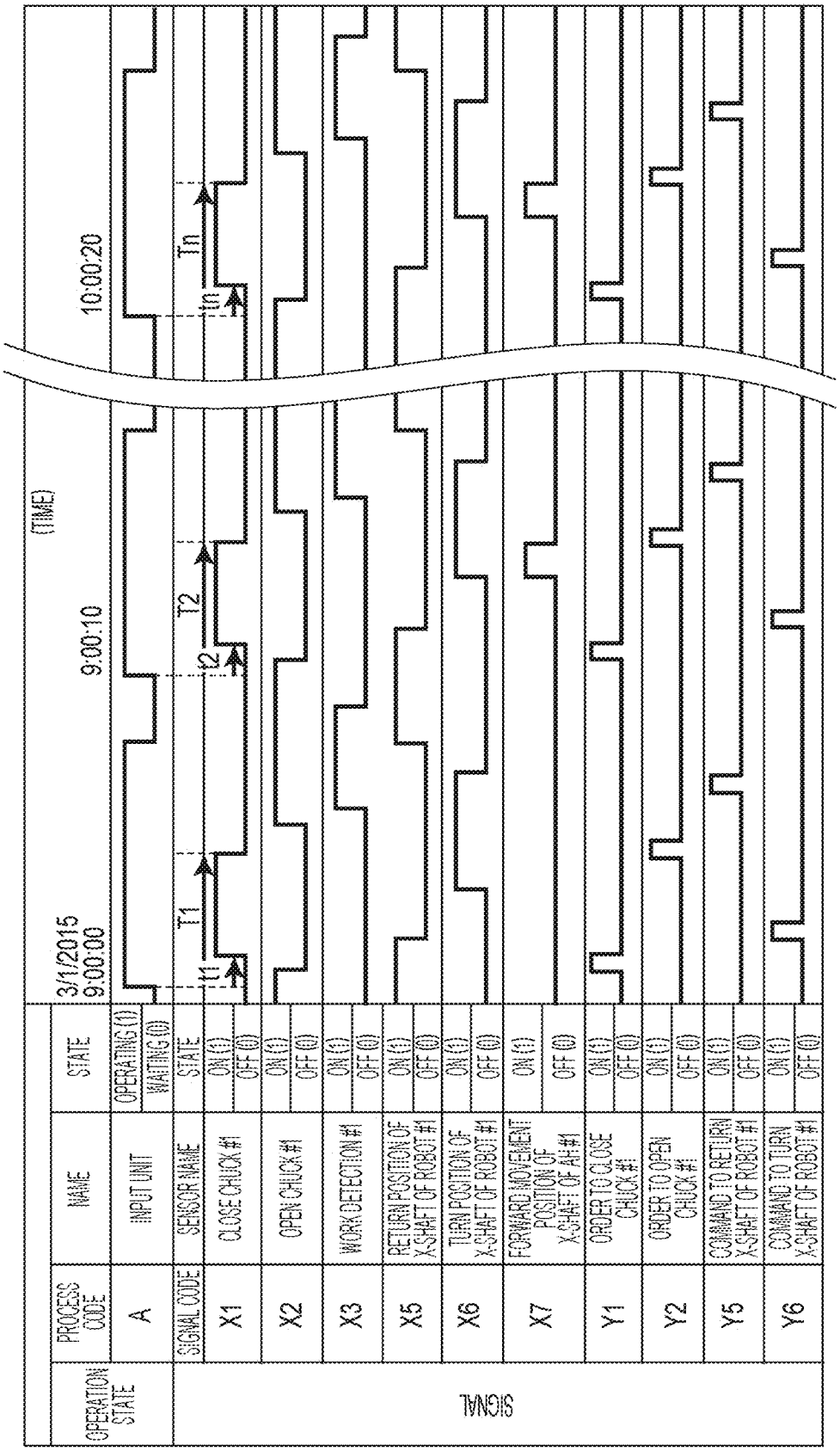
FIG. 5 is an operation timing chart regarding signals extracted from the charts shown in FIGS. 3A to 3C, that is, only signals with signal codes used by a process code A are shown over a plurality of cycles according to one or more aspects of the present disclosure.

The ON timing and the OFF timing of a signal refer to a time from the beginning of an operation of a process (1) to a transition to ON (1) or OFF (0) of the signal. FIG. 5 is an operation timing chart regarding signals extracted from the charts shown in FIGS. 3A to 3C, that is, only signals with signal codes used by the process code A (the input unit 203) over a plurality of cycles. In FIG. 5, t1, t2, and tn each indicate an ON timing, and T1, T2, and Tn each indicate an OFF timing. More specifically, in FIG. 5, t1 indicates an ON timing of a signal X1 in a first cycle, and tn indicates an ON timing of the signal X1 in an n-th cycle. In FIG. 5, T1 indicates an OFF timing of the signal X1 in the first cycle, and Tn indicates an OFF timing of the signal X1 in the n-th cycle.

There can be a slight difference in ON or OFF timing among sensors due to various factors such as a response speed, a control signal transmission time, a sliding friction of a machine, and/or the like. Therefore, values are measured for a plurality of cycles, and measured values are statically processed to determine a judgment threshold value defining an allowable variation in a normal state.

When the judgment condition generation unit 142 shown in FIG. 1 starts to generate the monitoring condition, the judgment condition generation unit 142 prompts an operator to input an analysis period. In response, the operator specifies a period including a plurality of cycles, such as those shown in FIG. 5, over which processes have been performed normally. The judgment condition generation unit 142 reads the operation state 131 and the signal 132 in the specified period.

As an example, a first row of the signal in use list shown in FIG. 4 is explain. A signal with a signal code X1 is described in the first row. As can be seen from the signal in use list, the signal with the signal code X1 is used in the process A (the input unit). Thus, ON timings t1, t2, . . . , tn and OFF timings T1, T2, . . . , Tn are determined from the operation state and the signal read as indicated in FIG. 5. More specifically, a time from the beginning of the operation to each transition to ON and a time from the beginning of the operation to each transition to OFF are determined. FIGS. 6A and 6B illustrate a result of the determination. In FIGS. 6A and 6B, a first row indicates ON timings and OFF timings of the signal X1 shown in FIG. 4 over a plurality of cycles.

The average value taken over all cycles and the deviation are calculated separately for each the ON timing and the OFF timing and separately for each of items. Next, the upper and lower limits of the threshold value are calculated, for example, as the average value±6×the deviation. When timings are within the range described above, signals are recorded as normal signals, but otherwise signals are recorded as abnormal signals. After threshold values are calculated for all items of the signal in use list, resultant judgment conditions and judgment threshold values are described in a list, for example, as shown in FIGS. 7A and 7B. The judgment condition and the judgment threshold value described in the list in FIGS. 7A and 7B may be employed as the judgment condition 134 in FIG. 1.

In the present embodiment, the operation state of each apparatus in each process is represented by one of two values such that when an operation is performed on a work by a machine during a period, the signal has a value of 1, while when a machine is waiting for a work to arrive in a waiting state, the signal value has a value of 0. However, signals may take other values depending on operation patterns of respective apparatuses in corresponding processes. For example, in a case where a plurality of models of articles are produced in one production line, operation states may be defined and represented by values for each type, for example, such that when an operation is performed on a model A, the operation state is represented by a value of 1, when an operation is performed on a model B, the operation state is represented by a value of 2, while when a waiting state in which a machine is waiting for a work to arrive is represented by a value of 0. This makes it possible to easily set monitoring states for each operation pattern of machines even in a case where the operation patterns of machines vary depending on models, that is, ON/OFF timings of signals vary depending on models.

Next, a program for monitoring a production line, the judgment unit 143, and the display processing unit 144 are described below.

When the judgment condition 134 is produced, the judgment unit 143 automatically starts to operate. When a new operation state 131 or signal 132 is recorded in the monitoring apparatus 120, the judgment unit 143 judges the signal based on the judgment condition 134. When a threshold value is exceeded, the signal is determined as an abnormal signal, and an occurrence time of the abnormality and a signal code of the signal having the abnormality are recorded as a history (an abnormality occurrence history) 135 in the storage unit.

The display processing unit 144 has a role of notifying an operator of an occurrence of an abnormality. When the abnormality occurrence history 135 is updated, the display processing unit 144 edits the abnormality occurrence history 135, the process operation state 131, the signal 132, and the judgment condition 134 into a visually easily understandable chart, and displays the resultant chart on the display unit 160.

Figure 8:
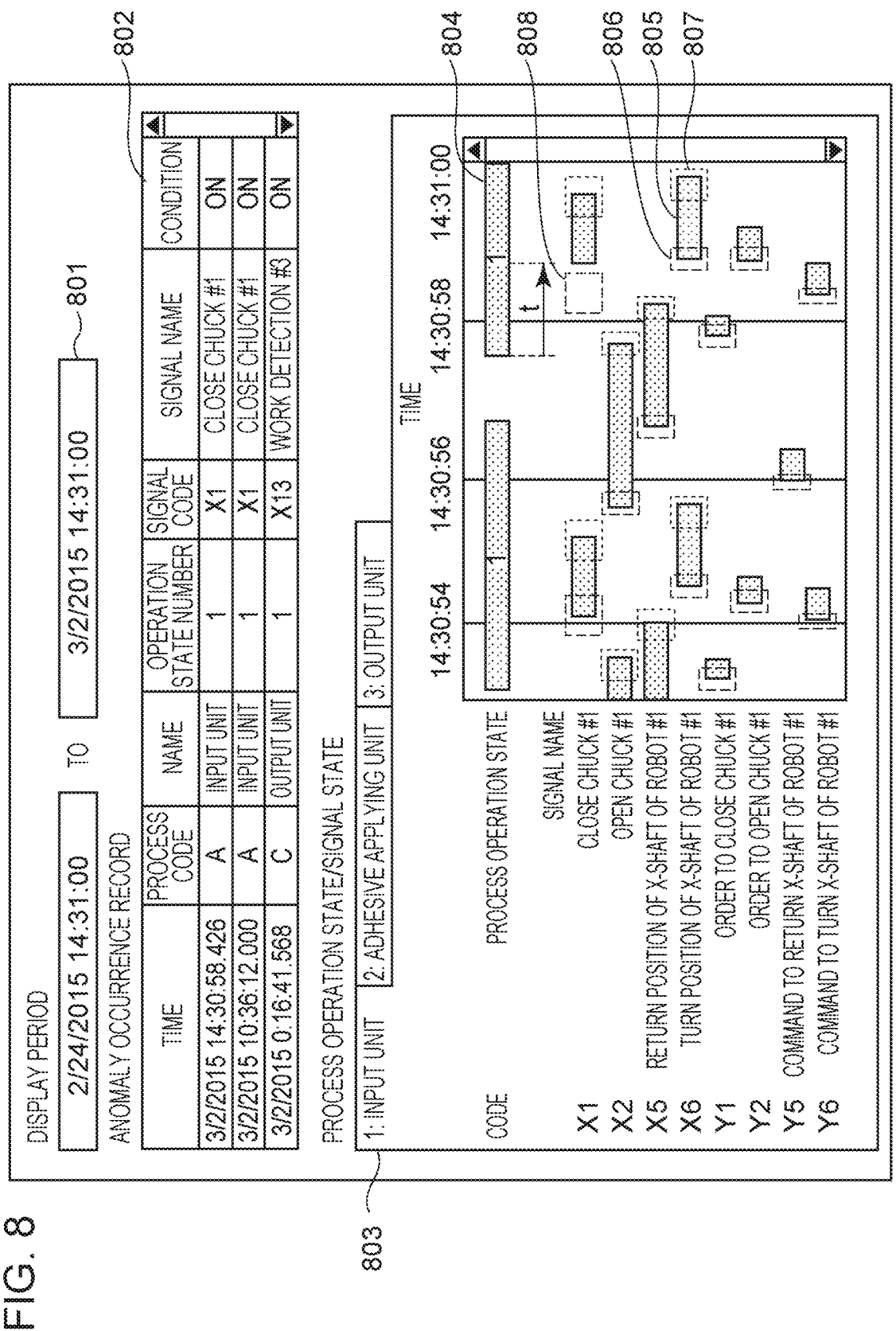
FIG. 8 is a diagram illustrating an example of a screen of a display unit according to one or more aspects of the present disclosure.

Next, a method of monitoring a production line is described below with reference to FIG. 1 and FIG. 8.

When the judgment condition 134 shown in FIG. 1 is recorded in the monitoring apparatus 120, the monitoring apparatus 120 starts to monitor the signal 132. The judgment unit 143 operates periodically to judge the signal 132 based on the judgment condition 134. If the signal 132 exceeds the threshold value, a time of occurrence of exceeding the threshold value, a process code, and a signal code are recorded as the abnormality occurrence history 135.

The display processing unit 144 displays the updated abnormality occurrence history 135 on the screen of the display unit 160 thereby notifying an operator of the occurrence of the abnormality. FIG. 8 illustrates an example of a screen displayed on the display unit 160 by the display processing unit 144. In FIG. 8, 801 denotes a period of an abnormality occurrence history displayed currently. In the present embodiment, the abnormality occurrence history in a particular period (for example, one week) from a date/time where the screen is updated is displayed. In FIG. 8, 802 denotes the abnormality occurrence history 135 displayed in the form of a table n the display period specified by 801.

An operator can get to know the occurrence of the abnormality and the state of the abnormality from the abnormality occurrence history 802. The operator then may select a specific abnormality occurrence history 802 more detailed information of which is to be displayed. In response to the selecting by the operator, the operation state and signals as of the occurrence of the abnormality are displayed in the form of a chart in a lower area of the screen. In FIG. 8, 803 denotes a selection element (for example, a tab) displayed on the screen to allow for selecting an apparatus in each process displayed in the chart form. In FIG. 8, 804 represents operation states of respective processes in the form of a bar chart, in which no bar parts each indicate a waiting state (0). In FIG. 8, 805 represents signals in the ON state (1) in the form of a bar chart, in which no bar parts each indicate the OFF state (0). In FIGS. 8, 806 and 807 are visual representations of threshold values (judgment threshold values) of the judgment condition 134 shown in FIG. 1. More specifically, a broken line denoted by 806 in FIG. 8 represents a normal range of the ON timing of the signal, a broken line denoted by 807 in FIG. 8 represents a normal range of the OFF timing of the signal. In FIG. 8, 808 represents a range where the ON timing of the signal is out of the normal range represented by the broken line and thus the signal is regarded as an abnormality. For easier understanding of the abnormality, the abnormal range 808 may be represented in a color different from that of the normal range. In response to selecting a selection element displayed on the screen thereby selecting an apparatus in a process, a signal code and a signal name associated with the apparatus in the process and/or a corresponding bar chart are displayed. In FIG. 8, by way of example, tabs are used as the selection elements for selecting apparatuses in processes. However, the selection elements are not limited to the tabs. For example, a selection may be made from a pull-down menu.

By displaying the abnormality occurrence history in the form of table as described above, it becomes possible for the operator to easily notice the occurrence of the abnormality. By displaying the operation states and the signals of the respective apparatuses in processes in the form of a chart, it becomes possible to get to know the abnormality occurrence status and to easily narrow down candidate causes.

Furthermore, the operator is allowed to easily build the monitoring apparatus simply by operating the production line in a usual manner and specifying a period in which signals used by machines are detected by the monitoring apparatus and specifying a period in which judgment threshold values are determined, even in a case where the number of machines or the number of signals is increased.

The disclosed techniques may be used in a production system in a production line used in a factory or the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An information processing apparatus configured to, in a system including a plurality of sensors and a plurality of apparatuses, acquire information regarding the plurality of apparatuses, the plurality of sensors being configured to output sensor signals in accordance with operation of the plurality of apparatuses, the plurality of apparatuses including a first apparatus and a second apparatus, the information processing apparatus comprising:
a first control unit configured to cause the first apparatus to operate in a first cycle and the first apparatus and the second apparatus to operate in a second cycle after the first cycle; and
a second control unit configured to acquire the sensor signals and operation information that is information regarding operation of the first apparatus and the second apparatus, in the first cycle and the second cycle,
wherein, based on the operation information in the first cycle, the second control unit identifies the sensor signals that are outputted in the first cycle as first sensor signals that are to be associated with the first apparatus, and
wherein, based on the operation information in the second cycle, the second control unit identifies the sensor signals that are other than the first sensor signals and are outputted in the second cycle as second sensor signals that are to be associated with the second apparatus.

2. The information processing apparatus according to claim 1, further comprising a display unit, wherein the second control unit compares, with a threshold value, a first timing that is a timing at which the first sensor signals or the second sensor signals are outputted, and the display unit displays abnormality information indicating occurrence of abnormality based on a difference between the first timing and the threshold value.

3. The information processing apparatus according to claim 2, wherein the display unit displays a range of the threshold value together with the first sensor signals or the second sensor signals.

4. The information processing apparatus according to claim 2, further comprising a storage unit configured to store the first timing and a second timing, wherein the second timing is a timing at which the operation of the first apparatus or the second apparatus is started.

5. The information processing apparatus according to claim 4, wherein the threshold value is determined from a value stored in the storage unit.

6. The information processing apparatus according to claim 2,
wherein the second control unit displays, on the display unit, the abnormality information with a display form of the threshold value the first timing of which does not fall within the range different from a display form of the threshold value the first timing of which falls within the range.

7. The information processing apparatus according to claim 2, wherein the second control unit acquires the first timing in the first sensor signal or the second sensor signal in a plurality of cycles, and acquires a difference of the first timing in the first sensor signal or the second sensor signal.

8. The information processing apparatus according to claim 2, wherein the second control unit acquires the first timing in a plurality of cycles and acquires the threshold value based on an amount of statistics of the first timing.

9. The information processing apparatus according to claim 1, further comprising a display unit,
wherein, in response to selection of the first apparatus or the second apparatus on the display unit, the first sensor signals that are associated with the first apparatus or the second sensor signals that are associated with the second apparatus are displayed on the display unit.

10. The information processing apparatus according to claim 1,
wherein the first sensor signals and the second sensor signals include a signal that is outputted by switching of the sensors from an OFF state to an ON state, a signal that is outputted by switching of the sensors from an ON state to an OFF state, or both.

11. The information processing apparatus according to claim 1,
wherein the second control unit associates the first apparatus and the first sensor signals with one another automatically, and the second control unit associates the second apparatus and the second sensor signals with one another automatically.

12. The information processing apparatus according to claim 1,
wherein the second control unit generates a list that shows a first correspondence between the first apparatus and the first sensor signals and a second correspondence between the second apparatus and the second sensor signals.

13. The information processing apparatus according to claim 12, wherein the second control unit sequentially records the first sensor signals in the list in the first cycle, and identifies the sensor signals other than the first sensor signals based on the list in the second cycle.

14. The information processing apparatus according to claim 1, further comprising:
a display unit,
wherein the second control unit displays, on the display unit, the operation information in a form of a first bar chart, the first sensor signals or the second sensor signals in a form of a second bar chart.

15. The information processing apparatus according to claim 14,
wherein the second bar chart indicates that the first sensor signal or the second sensor signal is in an ON state.

16. The information processing apparatus according to claim 14,
wherein the second control unit displays, on the display unit, in a display form different from a display form of the second bar chart, a threshold value regarding a first timing that is a timing at which the first sensor signals or the second sensor signals are outputted.

17. The information processing apparatus according to claim 16,
wherein the second control unit displays, on the display unit, the threshold value as a broken line with superimposition on a part of the second bar chart.

18. The information processing apparatus according to claim 1, further comprising:
a display unit,
wherein the second control unit displays, on the display unit, as information regarding the first sensor signals or the second sensor signals, a name of the first apparatus or the second apparatus, a name of operation performed by the first apparatus or the second apparatus, a name of a command for causing the first apparatus or the second apparatus to operate, and a signal symbol that is a symbol representing the first sensor signals or the second sensor signals.

19. The information processing apparatus according to claim 1, wherein the second control unit identifies the first sensor signals and the second sensor signals based on a gradual increase in a number of apparatuses that start to operate in causing the plurality of apparatuses to operate.

20. The information processing apparatus according to claim 1, wherein the second control unit identifies the first sensor signals and the second sensor signals based on a gradual decrease in a number of operating apparatuses in the plurality of apparatuses in operation.

21. The information processing apparatus according to claim 1, wherein the second control unit identifies the first sensor signals and the second sensor signals based on a period specified by a user.

22. The information processing apparatus according to claim 1, wherein the second control unit acquires the operation information based on a period from a timing at which the first apparatus or the second apparatus is turned from a waiting state to an in-operation state to a timing at which the first apparatus or the second apparatus is turned from the in-operation state to the waiting state.

23. The information processing apparatus according to claim 1, wherein the first control unit causes only the first apparatus to operate in the first cycle and causes the first apparatus and the second apparatus to operate in the second cycle.

24. The information processing apparatus according to claim 1, wherein the second control unit identifies the first control signals and the second control signals based on a period specified by a user.

25. An article production method for producing an article using a production system, the production system including a system and an information processing apparatus, the system including a plurality of sensors and a plurality of apparatuses, the information processing apparatus being configured to acquire information regarding the plurality of apparatuses, the information processing apparatus including a first control unit and a second control unit, the plurality of sensors being configured to output sensor signals in accordance with operation of the plurality of apparatuses, the plurality of apparatus including a first apparatus and a second apparatus, the article production method comprising:
causing, by a first control unit of the information processing apparatus, the first apparatus to operate in a first cycle and the first apparatus and the second apparatus to operate in a second cycle after the first cycle; and
acquiring, by a second control unit of the information processing apparatus, the sensor signals and operation information that is information regarding operation of the first apparatus and the second apparatus, in the first cycle and the second cycle,
wherein, based on the operation information in the first cycle, the second control unit identifies the sensor signals that are outputted in the first cycle as first sensor signals that are to be associated with the first apparatus,
wherein, based on the operation information in the second cycle, the second control unit identifies the sensor signals that are other than the first sensor signals and are outputted in the second cycle as second sensor signals that are to be associated with the second apparatus, and
producing the article by causing the first apparatuses and the second apparatus to operate by the first control unit.

26. An information processing method used by an information processing apparatus configured to, in a system including a plurality of sensors and a plurality of apparatuses, acquire information regarding the plurality of apparatuses, the information processing apparatus including a first control unit and a second control unit, the plurality of sensors being configured to output sensor signals in accordance with operation of the plurality of apparatuses, the plurality of apparatuses including a first apparatus and a second apparatus, the information processing method comprising:
causing, by the first control unit of the information processing apparatus, the first apparatus to operate in a first cycle and the first apparatus and the second apparatus to operate in a second cycle after the first cycle; and
acquiring, by the second control unit of the information processing apparatus, the sensor signals and operation information that is information regarding operation of the first apparatus and the second apparatus, in the first cycle and the second cycle,
wherein, based on the operation information in the first cycle, the second control unit identifies the sensor signals that are outputted in the first cycle as first sensor signals that are to be associated with the first apparatus, and
wherein, based on the operation information in the second cycle, the second control unit identifies the sensor signals that are other than the first sensor signals and are outputted in the second cycle as second sensor signals that are to be associated with the second apparatus.

27. A non-transitory computer-readable storage medium storing a program that enables a computer to execute the information processing method according to claim 26.

28. An information processing apparatus configured to, in a system including a plurality of apparatuses, acquire information regarding the plurality of apparatuses, the plurality of apparatuses including a first apparatus and a second apparatus, the information processing apparatus comprising:

a first control unit configured to cause the first apparatus to operate in a first cycle and the first apparatus and the second apparatus to operate in a second cycle after the first cycle based on control signals; and a second control unit configured to acquire the control signals and operation information that is information regarding operation of the first apparatus and the second apparatus, in the first cycle and the second cycle, wherein, based on the operation information in the first cycle, the second control unit identifies the control signals that are outputted in the first cycle as first control signals that are to be associated with the first apparatus, and wherein, based on the operation information in the second cycle, the second control unit identifies the control signals that are other than the first control signals and are outputted in the second cycle as second control signals that are to be associated with the second apparatus.

29. The information processing apparatus according to claim 28, further comprising a display unit, wherein the second control unit compares, with a threshold value, a first timing that is a timing at which the first control signals or the second control signals are outputted, and the display unit displays abnormality information indicating occurrence of abnormality based on a difference between the first timing and the threshold value.

30. The information processing apparatus according to claim 29, wherein the display unit displays a range of the threshold value together with the first control signals or the second control signals.

31. The information processing apparatus according to claim 29,
wherein the second control unit displays, on the display unit, the abnormality information with a display form of the threshold value the first timing of which does not fall within the range different from a display form of the threshold value the first timing of which falls within the range.

32. The information processing apparatus according to claim 28, further comprising:
a display unit,
wherein the second control unit displays, on the display unit, the operation information in a form of a first bar chart, and the first control signals or the second control signals in a form of a second bar chart.

33. The information processing apparatus according to claim 32,
wherein the second control unit displays, on the display unit, in a display form different from a display form of the second bar chart, a threshold value regarding a first timing that is a timing at which the first control signals or the second control signals are outputted.

34. The information processing apparatus according to claim 33,
wherein the second control unit displays, on the display unit, the threshold value as a broken line with superimposition on a part of the second bar chart.

35. The information processing apparatus according to claim 28, further comprising:
a display unit,
wherein the second control unit displays, on the display unit, as information regarding the first control signals or the second control signals, a name of the first apparatus or the second apparatus, a name of operation performed by the first apparatus or the second apparatus, a name of a command for causing the first apparatus or the second apparatus to operate, and a signal symbol that is a symbol representing the first control signals or the second control signals.

36. An information processing method used by an information processing apparatus configured to, in a system including a plurality of apparatuses, acquire information regarding the plurality of apparatuses, the information processing apparatus including a first control unit and a second control unit, the plurality of apparatuses including a first apparatus and a second apparatus, the information processing method comprising:

causing, by the first control unit of the information processing apparatus, the first apparatus to operate in a first cycle and the first apparatus and the second apparatus to operate in a second cycle after the first cycle based on control signals; and acquiring, by the second control unit of the information processing apparatus the control signals, and operation information that is information regarding operation of the first apparatus and the second apparatus, in the first cycle and the second cycle, wherein, based on the operation information in the first cycle, the second control unit identifies the control signals that are outputted in the first cycle as first control signals that are to be associated with the first apparatus, and wherein, based on the operation information in the second cycle, the second control unit identifies the control signals that are other than the first control signals and are outputted in the second cycle as second control signals that are to be associated with the second apparatus.

37. A non-transitory computer-readable storage medium storing a program that enables a computer to execute the information processing method according to claim 36.

38. An article production method for producing an article using a production system, the production system including a system and an information processing apparatus, the system including a plurality of apparatuses, the information processing apparatus being configured to acquire information regarding the plurality of apparatuses, the information processing apparatus including a first control unit and a second control unit, the plurality of apparatus including a first apparatus and a second apparatus, the article production method comprising:

causing, by a first control unit of the information processing apparatus, the first apparatus to operate in a first cycle and the first apparatus and the second apparatus to operate in a second cycle after the first cycle based on control signals; and acquiring, by a second control unit of the information processing apparatus, the control signals, and operation information that is information regarding operation of the first apparatus and the second apparatus, in the first cycle and the second cycle, wherein, based on the operation information in the first cycle, the second control unit identifies the control signals that are outputted in the first cycle as first control signals that are to be associated with the first apparatus, wherein, based on the operation information in the second cycle, the second control unit identifies the control signals that are other than the first control signals and are outputted in the second cycle, as second control signals that are to be associated with the second apparatus, and producing the article by causing the first apparatuses and the second apparatus to operate by the first control unit.

\* \* \* \* \*